United States Patent Office 3,100,753
Patented Aug. 13, 1963

3,100,753
COMPOSITION COMPRISING A MIXTURE OF POLYETHYLENE AND AN ALKYLALKOXY-SILANE
Framroze J. Spencer, Dickinson, Tex., assignor to Monsanto Chemical Company, St. Louis, Mo., a corporation of Delaware
No Drawing. Filed Aug. 21, 1958, Ser. No. 756,290
8 Claims. (Cl. 260—29.1)

The present invention relates to films and compositions for the preparation thereof. More particularly, it relates to polyethylene films having improved optical properties.

Polyethylene is a polymer which is well known and widely used and one which is currently in great commercial demand in several different forms one of which is film. Because of its many desirable physical properties, blown polyethylene film finds extensive application in packaging materials such as envelopes, bags, pouches, etc. Likewise, self-supporting sheets of polyethylene are also admirably suited for packaging and wrapping purposes. In these uses, certain requirements with respect to gloss, clarity, haze, etc., must be met. Frequently, this presents a problem of some magnitude since self-supporting polyethylene films either in the form of seamless tubing or sheeting oftentimes are hazy or cloudy in appearance.

It is an object of this invention, therefore, to provide a new and improved polyethylene composition. Another object of the invention is to provide a polyethylene composition for producing film having improved optical properties. A further object of the invention is to provide polyethylene films of improved optical properties. These and other objects and advantages of the invention which will become apparent hereinafter are attained by providing a composition consisting essentially of polyethylene having incorporated therein a minor amount of an alkylalkoxysilane and thereafter forming a self-supporting film from said composition in any manner known to the art such as, for example, by extruding such composition in the molten state through an appropriately shaped die.

The composition may be prepared by any method suitable for insuring a uniform mixture of polyethylene and the alkylalkoxysilane which can then be blown, drawn or extruded to form a film. Such methods include, for example, incorporation of the additive by melt blending or fluxing of the ingredients in an apparatus such as a Banbury mixer, heated rolls, heated extruders of the single or double screw type, or in any other conventional apparatus used to compound plastics; dry blending in a tumbler mill; preparation of a concentrate of polyethylene and the alkylalkoxysilane by one of the above-mentioned methods and blending of this in turn with polyethylene molding powder by tumbling or other suitable means; or any combination of the methods mentioned.

The alkylalkoxysilanes which are sometimes referred to as esters of ortho-silicic acid or organic ethers of silicon that are useful in the compositions of the invention are compounds having some organic groups linked directly to silicon, whereas others are joined through oxygen. They are compounds corresponding to the formula

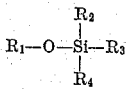

wherein $R_1$ and $R_2$ are alkyl radicals containing from 1 to 8 carbon atoms and $R_3$ and $R_4$ may be alkyl or alkoxy radicals containing from 1 to 8 carbon atoms. Examples of such compounds include trimethylmethoxysilane, trimethylethoxysilane, trimethylbutoxysilane, dimethyldiethoxysilane, dimethyldibutoxysilane, dimethyldiethoxysilane, methyltriethoxysilane, methyltributoxysilane, ethyltrimethoxysilane, ethyltriethoxysilane, isopropyltriethoxysilane, isobutyltriethoxysilane, isoamyltriethoxysilane, hexyltriethoxysilane, diethyldiethoxysilane, and the like.

In general, the proportion of alkylalkoxysilane used in polyethylene to achieve significant improvement in gloss and clarity and decreased haze in the polyethylene film fabricated therefrom must be at least about 0.05% by weight of the polyethylene. Increasing amounts of the additive will, of course, be increasingly effective. Usually there is no particular advantage in employing amounts of the alkylalkoxysilane greater than 5% by weight of the polyethylene and it is preferred to use between 0.1% and 1% by weight.

Although the compositions of the invention are composed essentially of polyethylene containing small amounts of alkylalkoxysilanes, the compositions may also contain small amounts of other desirable additives such as antioxidants, lubricants, antistatic agents and the like, provided the additional ingredients are not present in amounts sufficient to alter the efficacy of the silane.

The polyethylene compositions herein disclosed and claimed are particularly useful for fabrication by extrusion into thin films, sheets, blown tubing, and the like.

The following examples illustrate specific embodiments of the invention, but are not to be considered as limiting it in any manner.

*Example*

Identical samples of polyethylene in granular form taken from the same batch were separately charged to a Banbury mixer. Methyltriethoxysilane was added to one and dimethyldiethoxysilane to the other, both in an amount representing 0.15% by weight of the polyethylene charge. Each mixture was blended at a speed of approximately 230 r.p.m. at a temperature of about 240° F. until fused. Thirty seconds after fusion occurred, the speed of the mixer was reduced to about 80 r.p.m. and the mixture was allowed to cool at the low speed to a temperature of 140° F., after which it was dumped from the mixer. The resultant powdery mass was converted into pellets by passing it through a conventional extruder-dicer arrangement.

The blended compositions were then extruded into blown tubing in a standard plastics extrusion machine at a temperature of 360° F. The tubing was slit to a flat film having a thickness of approximately 1.5 mils and its optical properties were tested. Samples of the unmodified polyethylene were also extruded under identical conditions and in the same thickness to serve as controls for comparison with the modified ones. As measured by standard techniques on a Gardner-Hayes glossmeter, the films made from the polyethylene containing methyltriethoxysilane and dimethyldiethoxysilane showed increases in gloss values of 8 and 5 percentage points and decreases in haze of 20% and 15%, respectively, over that made from the untreated polyethylene. Clarity of the film made from polyethylene containing the silane additives was improved by as much as 200% over that of the film in which none had been incorporated. This figure is based on an instrumental determination of clarity by means of light transmission and not merely on visual observation, although the improvement is clearly obvious to the naked eye.

What is claimed is:
1. A plastic composition comprising polyethylene and from about 0.05% to about 5% by weight of said polyethylene of a silane of the formula

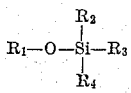

wherein $R_1$ and $R_2$ are alkyl radicals containing from 1 to 8 carbon atoms and $R_3$ and $R_4$ are chosen from the group consisting of alkyl and alkoxy radicals containing from 1 to 8 carbon atoms.

2. A plastic composition comprising polyethylene and from about 0.1% to about 1% by weight of said polyethylene of a silane of the formula

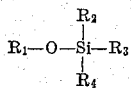

wherein $R_1$ and $R_2$ are alkyl radicals containing from 1 to 8 carbon atoms and $R_3$ and $R_4$ are chosen from the group consisting of alkyl and alkoxy radicals containing from 1 to 8 carbon atoms.

3. A plastic composition comprising polyethylene and from about 0.1% to about 1% by weight of said polyethylene of methyltriethoxysilane.

4. A plastic composition comprising polyethylene and from about 0.1% to about 1% by weight of said polyethylene of dimethyldiethoxysilane.

5. A self-supporting plastic film of improved optical properties formed of a composition comprising polyethylene and from about 0.05% to about 5% by weight of said polyethylene of a silane of the formula

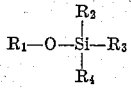

wherein $R_1$ and $R_2$ are alkyl radicals containing from 1 to 8 carbon atoms and $R_3$ and $R_4$ are chosen from the group consisting of alkyl and alkoxy radicals containing from 1 to 8 carbon atoms.

6. A self-supporting plastic film of improved optical properties formed of a composition comprising polyethylene and from about 0.1% to about 1% by weight of said polyethylene of a silane of the formula

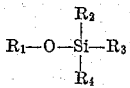

wherein $R_1$ and $R_2$ are alkyl radicals containing from 1 to 8 carbon atoms and $R_3$ and $R_4$ are chosen from the group consisting of alkyl and alkoxy radicals containing from 1 to 8 carbon atoms.

7. A self-supporting plastic film of improved optical properties formed of a composition comprising polyethylene and from about 0.1% to about 1% by weight of said polyethylene of methyltriethoxysilane.

8. A self-supporting plastic film of improved optical properties formed of a composition comprising polyethylene and from about 0.1% to about 1% by weight of said polyethylene of dimethyldiethoxysilane.

References Cited in the file of this patent

UNITED STATES PATENTS

| | | |
|---|---|---|
| 2,645,624 | Hunter | July 14, 1953 |
| 2,806,256 | Smith-Johannsen | Sept. 17, 1957 |

OTHER REFERENCES

Raff et al.: "Polyethylene," volume XI, 1956, Interscience Publishers, Inc., New York, pages 238 and 239.

Butterey: "Plasticizers," 2nd edition, 1957, Cleaver-Hume Press Ltd., pages 33 and 64.